United States Patent
Buss et al.

(10) Patent No.: US 6,808,230 B2
(45) Date of Patent: Oct. 26, 2004

(54) SEAT MODULE FOR A VEHICLE SEAT WHICH CAN BE ACTIVELY VENTILATED AND METHOD OF MAKING SAME

(75) Inventors: Henning Buss, Gerlingen (DE); Joachim Kunkel, Stuttgart (DE); Karl Pfahler, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/860,592

(22) Filed: May 21, 2001

(65) Prior Publication Data

US 2002/0003363 A1 Jan. 10, 2002

(30) Foreign Application Priority Data

May 19, 2000 (DE) ........................................ 100 24 880

(51) Int. Cl.⁷ ................................................ B60N 2/56
(52) U.S. Cl. .............................. 297/180.12; 297/180.14
(58) Field of Search ....................... 297/180.12, 180.73, 297/180.14, 452.23, 452.24, 452.36, 452.6, 452.59; 5/423, 721, 72 C

(56) References Cited

U.S. PATENT DOCUMENTS

| | | | | |
|---|---|---|---|---|
| 4,368,917 A | * | 1/1983 | Urai ...................... | 297/452.24 |
| 4,592,588 A | * | 6/1986 | Isono et al. .............. | 297/284.6 |
| 4,883,320 A | * | 11/1989 | Izumida et al. ........ | 297/452.56 |
| 6,019,420 A | | 2/2000 | Faust et al. ............. | 297/180.14 |
| 6,026,465 A | | 2/2000 | Mills et al. ............. | 297/180.14 |
| 6,064,037 A | * | 5/2000 | Weiss et al. ............ | 297/180.12 |
| 6,186,592 B1 | * | 2/2001 | Orizaris et al. ........ | 297/180.12 |
| 6,189,966 B1 | * | 2/2001 | Faust et al. ............ | 297/180.14 |
| 6,196,627 B1 | * | 3/2001 | Faust et al. ............ | 297/180.14 |
| 6,224,150 B1 | * | 5/2001 | Eksin et al. ............ | 297/180.13 |
| 6,247,751 B1 | * | 6/2001 | Faust et al. ............ | 297/180.13 |

FOREIGN PATENT DOCUMENTS

| | | |
|---|---|---|
| DE | 19745521 A1 | 4/1999 |
| DE | 19804284 A1 | 8/1999 |
| DE | 19847384 A1 | 8/1999 |
| GB | 2343112 A | 5/2000 |
| JP | 10-151037 | 6/1998 |
| JP | 2001-149425 | 6/2001 |

\* cited by examiner

*Primary Examiner*—Peter R. Brown
(74) *Attorney, Agent, or Firm*—Crowell & Moring LLP

(57) ABSTRACT

A seat module is designed as a seat cushion or backrest and can be actively ventilated. The seat module includes a cushion, which has a cushion pad impermeable to air and an upholstered zone that extends over the latter and through which air can be made to flow and which is covered by an air-permeable cushion cover. A cushion carrier accommodates the cushion. To improve the quality of the module as regards sitting comfort and long-term stability combined with low manufacturing costs, the upholstered zone through which air can be made to flow is composed of three layers and in the manner of a sandwich of two rubberized hair layers and a knitted layer of coarse-mesh knitted spacing fabric in between the hair layers.

17 Claims, 1 Drawing Sheet

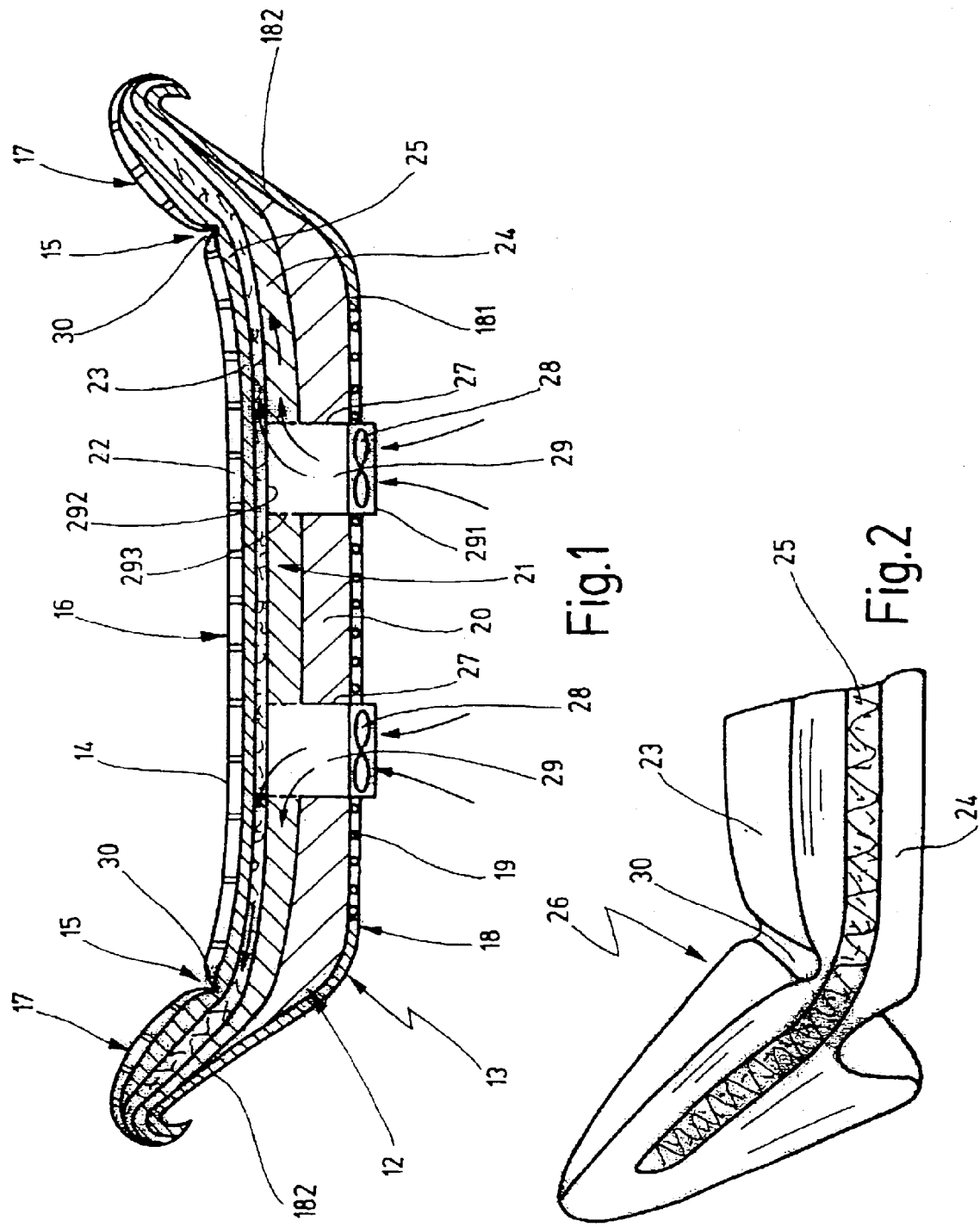

SEAT MODULE FOR A VEHICLE SEAT WHICH CAN BE ACTIVELY VENTILATED AND METHOD OF MAKING SAME

BACKGROUND AND SUMMARY OF THE INVENTION

This application claims the priority of German Patent Document 100 24 880.2, filed in Germany, May 19, 2000, the disclosure of which is expressly incorporated by reference herein.

The invention relates to a seat module, which is designed as a seat cushion or backrest, can be actively ventilated and is intended for a vehicle seat. Preferred embodiments of the invention relate to such a seat module which is designed as a seat cushion or backrest and can be actively ventilated, having a cushion, which has a cushion pad impermeable to air and an upholstered zone that extends over the latter and through which air can be made to flow and which is covered by an air-permeable cushion cover.

In the case of a known seat module of this kind designed as a seat cushion (DE 198 04 284 A1, corresponding U.S. Pat. No. 6,019,420), the aim of creating an economical solution for ventilating vehicle seats in the medium and lower price categories is served by manufacturing the upholstered zone through which air can be made to flow completely from rubberized hair, which, on the one hand, rests on a dense foam block impermeable to air and, on the other hand, is covered by a cushion cover permeable to air with a cushion filling made of wadding, non-woven wool or an open-cell or at least partially perforated foam in between. At least one through air-inlet channel and one through air-outlet channel are arranged in the foam block, and a miniature fan is arranged on the air-inlet channel. The latter draws in air from below the seat module and forces it through the rubberized hair mat, in which it spreads out in all directions, finally re-emerging at the underside of the seat module via the air-outlet channel.

In the case of a known seat module designed as a backrest (DE 197 45 521 A1), the cushion is secured on a cushion carrier clamped in the frame of the backrest. The cushion is embodied with a face area and two bead-like side areas. The face area and the side areas are formed by means of so-called tacking channels or seams. The cushion comprises a foam cushion pad that rests on the cushion carrier, an air-guiding layer comprising a coarse-mesh knitted spacing fabric that covers the entire surface of the cushion pad in the face area, an air-permeable pressure distribution layer composed of an open-cell foam resting on the air-guiding layer, and an air-permeable cushion cover that covers the surface of the cushion. The cushion is ventilated by miniature fans, which draw in air from the rear side of the cushion and force it through the air-guiding layer, it being possible for the air to flow out again via the cushion cover. For this purpose, each miniature fan is inserted into a bush that passes right through the cushion pad, extends as far as the air-guiding layer and is open on the rear side of the cushion pad. The ventilation in the bead-like side areas is performed by separate fans since the tacking channels separate the air flow that enters the face area from the bead areas at the edges.

In the case of a known seat module likewise designed as a seat cushion (DE 198 47 384 A1, corresponding GB 2 343 112), the upholstered zone that extends over the cushion pad and through which air can be made to flow comprises a coarse-mesh knitted spacing fabric and is covered by an air-permeable cushion cover with a cover filling in between. To form the cushion contours, the cushion cover is pulled into tacking seams and stretched by tacking hooks on a tacking wire extending along the underside of the upholstered zone. For active ventilation of the seat module, air channels are formed in the cushion pad, extending from the underside of the cushion pad as far as the upholstered zone through which air can be made to flow. A miniature fan is arranged in each air channel. To circumvent the air flow barrier formed by the tacking seams, the air channels are arranged in such a way in the region of a tacking seam that the air emerging from the air channel flows into the upholstered zone on both sides of the tacking seam. A seat module of this kind has hard, firm seating characteristics because of the proximity of the upholstered zone composed of relatively hard knitted spacing fabric to the surface of the cushion, and, moreover, its settling behaviour and long-term stability do not meet all requirements and the knitted structure is imprinted on the surface after prolonged use.

An object on which the invention is based is, in the case of a seat module of the type stated at the outset, to improve the quality of the module as regards sitting comfort and long-term stability while achieving savings, especially in the area of active ventilation.

According to certain preferred embodiments of the invention, the object is achieved by providing a seat module, which is designed as a seat cushion or backrest and can be actively ventilated, having a cushion, which has a cushion pad impermeable to air and an upholstered zone that extends over the latter and through which air can be made to flow and which is covered by an air-permeable cushion cover, wherein the upholstered zone through which air can be made to flow has three layers and is composed in the manner of a sandwich of two rubberized hair layers and a knitted layer of coarse-mesh knitted spacing fabric in between the hair layers.

The seat module according to the invention has the advantage of significantly improved sitting comfort since the knitted fabric is embedded in rubberized hair and is at an optimum distance from the surface of the module. The reinforcing sandwich construction improves the settling behaviour of the rubberized hair, with the result that greater long-term stability of the cushion is achieved. Moreover, the sandwich construction, in which the knitted fabric is firmly connected to the two rubberized hair layers, makes assembly significantly easier when positioning the knitted fabric, and this has an advantageous effect on production costs. The positioning of the knitted fabric between two rubberized hair layers ensures that the layer of knitted spacing fabric, which makes a significant contribution to the guidance of the air, extends under the required tacking and hence ensures good ventilation of the cushion right into the side areas. Thanks to the significant improvement in air distribution, the number of fans required for adequate ventilation can be reduced, thereby allowing further cost savings.

Advantageous embodiments of the seat module according to the invention together with expedient developments and refinements of the invention are described herein and in the claims.

According to a preferred embodiment of the invention, during production the knitted spacing fabric is inserted between the rubberized hair layers and connected to them to form a sandwich-type mat. A sandwich-type mat of this kind is much easier to fit when manufacturing the seat module than individual layers, thereby reducing the assembly time.

According to an advantageous embodiment of the invention, the upper rubberized hair layer is made as thin as possible, its minimum thickness being limited by the required sitting comfort. This ensures that the air-guiding knitted layer is close to the surface in order to allow the ventilation to take effect quickly. At the same time, care should be taken that the upper rubberized hair layer is not too thin so that the seat module does not have hard seating characteristics.

According to an advantageous embodiment of the invention, the cushion cover is tensioned by means of tacking in the cushion, this tacking dividing the cushion into a face area and two side areas extending in the longitudinal direction and adjoining the face area. The tacking is fixed in the upper rubberized hair layer of the sandwich-type mat. This type of tacking ensures that the air can be guided unhindered under the tacking in the knitted layer, thus allowing the side areas to be adequately ventilated without additional fans.

The invention is described in greater detail below with reference to an exemplary embodiment illustrated in the drawing.

Other objects, advantages and novel features of the present invention will become apparent from the following detailed description of the invention when considered in conjunction with the accompanying drawings.

BRIEF DESCRIPTION OF THE DRAWINGS

FIG. 1 schematically shows a cross section through a seat module designed as a seat cushion, FIG. 2 shows a partial perspective view of a sandwich-type mat in the seat module shown in FIG. 1.

DETAILED DESCRIPTION OF THE PREFERRED EMBODIMENT

The seat module shown in cross section in FIG. 1 is used as a seat cushion of a vehicle seat. The seat module has a cushion 12 that is covered with a cushion cover 14 and is secured on a cushion carrier 13. The cushion cover 14 is stretched over the cushion 12 by tacking 15, which divides the surface of the cushion into a face area 16 and two side areas 17, which extend in the longitudinal direction and adjoin the face area 16. In the case of a seat module used as a seat cushion, the side areas 17 are referred to as lateral cheeks and, in the case of a seat module designed as a backrest, as edge beads.

The cushion carrier 13 comprises a cushion shell 18 made of plastic or metal, which has a deep-drawn central shell portion 181 and two lateral shell portions 182 that extend away obliquely upwards at the edges. The cushion shell 18 is cut out over a large part of the face area 16, the cutout being spanned by a spring core 19 of tensioned spring wire hooked into the cushion shell 18. In an alternative embodiment of the cushion shell 18, the spring core 19 is dispensed with and the central shell portion 181 is made continuous.

The cushion 12 comprises a cushion pad 20, which rests on the cushion carrier 13 and is designed as a foam block, and an upholstered zone 21, which extends above the latter, through which air can be made to flow and which is covered by the air-permeable cushion cover 14 with a perforated electric heating mat 22 in between. The upholstered zone 21 through which air can be made to flow is in three layers and is made up in the form of a sandwich of two rubberized hair layers 23, 24 and an interlayer 25 comprising a coarse-mesh knitted spacing fabric, referred to below as knitted layer 25. During production, the knitted layer 25 is inserted between the two rubberized hair layers 23, 24 and connected firmly to these to form a sandwich-type mat 26, as illustrated in the partial perspective view in FIG. 2. As FIG. 1 shows, the sandwich-type mat 26 lies in the cushion 12 with its lower rubberized hair layer 24 on the cushion pad 20, while the upper rubberized hair layer 23 is covered by the cushion cover 14 with the heating mat 22 underneath the latter. The upper rubberized hair layer 23 is made as thin as possible here to ensure that the knitted layer 25, which contributes most to the guidance of the air, is close to the surface of the cushion to enable the ventilation to take effect quickly. However, the minimum thickness of the upper rubberized hair layer 23 is limited by the required sitting comfort in order to prevent the knitted structure of the knitted layer 25 from being imprinted on the surface of the cushion, making the seat unpleasantly hard.

Through channels 27, into each of which a bush 29 containing a miniature fan 28 is inserted, are arranged in the cushion pad 20 to allow active ventilation of the seat module. The bush 29 has an air-inlet opening 291 situated a certain distance below the underside of the cushion pad 20 and, at the opposite end, air-outlet openings 292 and 293. The air-outlet opening 292 is formed by the open end of the bush 29, which rests against the underside of the lower rubberized hair layer 24, while the air-outlet opening 293 is formed by a perforated edge region of the bush 29, the said edge region passing through the lower rubberized hair layer 24. As a result, the air drawn in from the underside of the seat module by the miniature fans 28 is blown into the knitted layer 25, on the one hand, and into the lower rubberized hair layer 24, on the other hand, and spreads out in all directions in these layers. The upper rubberized hair layer 23 also takes part in the distribution of the air, with the result that, overall, the sandwich-type mat 26 serves to guide the air within the cushion 12.

For the tacking 15 of the cushion cover 14 at the transition between the face area 16 and the side areas 17, tacking seams 30 are incorporated into the upper rubberized hair layer 23 of the sandwich-type mat 26, these seams having inserted in them mutually spaced tacking hooks (not illustrated specifically here) that penetrate the sandwich-type mat 26 and pull the cushion cover 14 into the tacking seams 30. By virtue of the arrangement of the tacking seams 30 in the upper rubberized hair layer 23 of the sandwich-type mat 26, the air-guiding knitted layer 25 is guided under the tacking seams 30 into the side areas 17 of the cushion 12 without compression and the associated reduction in cross section, with the result that there is an optimum ventilation channel for the side areas 17 of the cushion 12, this ventilation channel ensuring adequate ventilation of the side areas 17.

The invention is not restricted to the described exemplary embodiment of the seat module designed as a seat cushion. The seat module can also be designed with the same structure as a backrest.

The cushion carrier 13 can be designed as a complete cushion shell 18 without a cutout. On the other hand, the spring core 19 can also extend over the entire central shell portion 181 and hence over the entire face area 16 of the cushion 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Seat module, which is designed as a seat cushion or backrest and can be actively ventilated, having a cushion, which has a cushion pad impermeable to air and an upholstered zone that extends over the latter and through which air can be made to flow and which is covered by an air-permeable cushion cover, wherein the upholstered zone through which air can be made to flow has three layers and is composed in the manner of a sandwich of two rubberized hair layers and a knitted layer of coarse-mesh knitted spacing fabric in between the hair layers, wherein to tension the cushion cover, it is drawn into tacking seams that divide the cushion into a face area and two side areas extending in the longitudinal direction;

wherein the tacking seams are formed in the upholstered zone;

wherein the tacking seams are fixed in the upper rubberized hair layer above the knitted layer of coarse-mesh knitted spacing fabric in between the hair layers without reducing a height of the knitted layer; and wherein the upholstered zone extends laterally of the tacking seams into the respective side areas.

2. Seat module according to claim 1, wherein during production, the knitted spacing fabric is inserted between the rubberized hair layers and connected to them to form a sandwich-type mat.

3. Seat module according to claim 2, wherein the sandwich-type mat rests by its lower rubberized hair layer on the cushion pad and wherein the cushion cover covers the upper rubberized hair layer.

4. Seat module according to claim 3, wherein a perforated heating mat is inserted between the upper rubberized hair layer and the cushion cover.

5. Seat module according to claim 4, wherein the upper rubberized hair layer is made thin, the minimum thickness being limited by the required sitting comfort.

6. Seat module according to claim 4, wherein the cushion pad has arranged in it channels that pass through it and into each of which channels a bush containing a miniature fan is inserted, and wherein the bush has an air-inlet opening situated on an underside of the cushion pad and air-outlet openings arranged in an end region that projects into the sandwich-type mat, which allow air to enter the knitted layer and the lower rubberized hair layer.

7. Seat module according to claim 3, wherein the upper rubberized hair layer is made thin, the minimum thickness being limited by the required sitting comfort.

8. Seat module according to claim 3, wherein the cushion pad has arranged in it channels that pass through it and into each of which channels a bush containing a miniature fan is inserted, and wherein the bush has an air-inlet opening situated on an underside of the cushion pad and air-outlet openings arranged in an end region that projects into the sandwich-type mat, which allow air to enter the knitted layer and the lower rubberized hair layer.

9. Seat module according to claim 2, wherein the upper rubberized hair layer is made thin, the minimum thickness being limited by the required sitting comfort.

10. Seat module according to claim 2, wherein the cushion pad has arranged in it channels that pass through it and into each of which channels a bush containing a miniature fan is inserted, and wherein the bush has an air-inlet opening situated on an underside of the cushion pad and air-outlet openings arranged in an end region that projects into the sandwich-type mat, which allow air to enter the knitted layer and the lower rubberized hair layer.

11. Seat assembly according to claim 10, comprising a cushion carrier underlying and supporting the cushion pad.

12. Seat module according to claim 2, wherein the cushion carrier is designed as a cushion shell, preferably composed of plastic or metal, which has a deep-drawn central shell portion and two lateral shell portions, which extend away obliquely upwards at the edges, and wherein the cushion pad lies in the central shell portion and the sandwich-type mat rests on the cushion pad and extends beyond the latter on both sides onto the lateral shell portions of the cushion shell.

13. Seat module according to claim 12, wherein the central shell portion has a central cutout, which is spanned by a spring core.

14. Seat module according to claim 1, wherein the upper rubberized hair layer is made thin, the minimum thickness being limited by the required sitting comfort.

15. Seat module according to claim 14, wherein the cushion pad has arranged in it channels that pass through it and into each of which channels a bush containing a miniature fan is inserted, and wherein the bush has an air-inlet opening situated on an underside of the cushion pad and air-outlet openings arranged in an end region that projects into the sandwich-type mat, which allow air to enter the knitted layer and the lower rubberized hair layer.

16. Seat assembly for a vehicle seat, comprising:

a cushion pad impermeable to air, an upholstered zone which extends over the cushion pad, and an air permeable cushion cover covering the upholstered zone, wherein the upholstered zone is air permeable and includes two rubberized hair layers and a knitted layer of coarse mesh knitted spacing fabric interposed between the rubberized hair layers, wherein the rubberized hair layers and knitted layer interposed therebetween extend laterally of tacking seams which tension the cushion cover at the seat assembly, and wherein the tacking seams are fixed in the upper rubberized hair layer above the knitted layer of coarse-mesh knitted spacing fabric in between the hair layers without reducing a height of the knitted layer.

17. Seat assembly according to claim 16, wherein during production, the knitted spacing fabric is inserted between the rubberized hair layers and connected to them to form a sandwich-type mat.

* * * * *